United States Patent
Beveridge et al.

(10) Patent No.: US 11,430,244 B2
(45) Date of Patent: Aug. 30, 2022

(54) STATISTICAL DATA FINGERPRINTING AND TRACING DATA SIMILARITY OF DOCUMENTS

(71) Applicant: Cylance Inc., Irvine, CA (US)

(72) Inventors: David Neill Beveridge, Portland, OR (US); David Michael Liebson, Portland, OR (US); Yaroslav Oliinyk, Portland, OR (US)

(73) Assignee: Cylance Inc., Irvine, CA (US)

( * ) Notice: Subject to any disclaimer, the term of this patent is extended or adjusted under 35 U.S.C. 154(b) by 0 days.

(21) Appl. No.: 17/132,767

(22) Filed: Dec. 23, 2020

(65) Prior Publication Data

US 2022/0198189 A1   Jun. 23, 2022

(51) Int. Cl.
| | | |
|---|---|---|
| G06V 30/418 | (2022.01) | |
| G06K 9/62 | (2022.01) | |
| G06F 17/18 | (2006.01) | |
| G06F 40/279 | (2020.01) | |
| G06V 10/75 | (2022.01) | |
| G06F 17/00 | (2019.01) | |

(52) U.S. Cl.
CPC ............ *G06V 30/418* (2022.01); *G06F 17/18* (2013.01); *G06F 40/279* (2020.01); *G06K 9/6215* (2013.01); *G06V 10/751* (2022.01)

(58) Field of Classification Search
CPC .... G06V 30/418; G06V 10/751; G06F 17/18; G06F 40/279; G06K 9/6215
See application file for complete search history.

(56) References Cited

U.S. PATENT DOCUMENTS

| | | | |
|---|---|---|---|
| 6,658,423 B1 * | 12/2003 | Pugh ..................... | G06F 16/355 |
| | | | 707/999.102 |
| 7,765,160 B2 | 7/2010 | Niles et al. | |
| 8,838,657 B1 * | 9/2014 | Malone .................. | G06F 16/93 |
| | | | 707/790 |

(Continued)

FOREIGN PATENT DOCUMENTS

| | | |
|---|---|---|
| CN | 111159115 A | 5/2020 |
| KR | 101403060 B1 | 6/2014 |

OTHER PUBLICATIONS

Yuzhakov, A.A., et al.; "Application of Fuzzy Search Algorithms and Neural Networks in Fingerprint Document Analysis"; IEEE; 2017; 3 pages.

(Continued)

*Primary Examiner* — Quoc A Tran
(74) *Attorney, Agent, or Firm* — Conley Rose, P. C.; J. Robert Brown, Jr.

(57) ABSTRACT

A method and computing device for statistical data fingerprinting and tracing data similarity of documents. The method comprises applying a statistical function to a subset of text in a first document thereby generating a first fingerprint; applying the statistical function to a subset of text in a second document thereby generating a second fingerprint; comparing the first fingerprint to the second fingerprint; and determining that the subset of text in the first document matches the subset of text in the second document based on the first fingerprint threshold matching the second fingerprint, wherein the statistical function is a measure of randomness of a count of each character in a subset of text against an expected distribution of said characters.

20 Claims, 6 Drawing Sheets

(56) References Cited

U.S. PATENT DOCUMENTS

| | | |
|---|---|---|
| 9,275,143 B2 | 3/2016 | Pugh et al. |
| 10,037,374 B2* | 7/2018 | Schwartz ............. G06V 10/424 |
| 2005/0132197 A1 | 6/2005 | Medlar |
| 2018/0113676 A1* | 4/2018 | De Sousa Webber .... G06F 7/20 |

OTHER PUBLICATIONS

European Extended Search Report; Application No. 21209091.4; dated May 9, 2022; 13 pages.

* cited by examiner

FIG. 1

Ingredient X is 0.1% Vibranium!

FIG. 2A ingredientxis0.1vibranium

FIG. 2B

Ingr3di3n7 x i5 0.1% vib24nium

FIG. 3A

Johsfejfou!Y!jt!¿&!Wjcsbojvn

FIG. 3B ingrdnt x is vibramn

STATISTICAL DATA FINGERPRINTING AND TRACING DATA SIMILARITY OF DOCUMENTS

FIELD

The present application generally relates to data integrity preservation, and more particularly, to determining statistical deviation of documents.

BACKGROUND

A challenge in data loss prevention is that of categorizing data in part and/or in whole to determine similarity between one set of text and another. Currently, whole documents can be classified and compared to other documents. However, identifying and comparing portions of user data within documents remains a challenge.

Simple industry block-hashing of documents or portions of documents means that trivial changes to the data in question can evade detection.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In a first aspect, the present application describes a computer-implemented method of statistical data fingerprinting and tracing data similarity of documents. The method may include applying a statistical function to a subset of text in a first document thereby generating a first fingerprint; applying the statistical function to a subset of text in the second document thereby generating a second fingerprint; comparing the first fingerprint to the second fingerprint; and determining that the subset of text in the first document matches the subset of text in the second document based on the first fingerprint threshold matching the second fingerprint, wherein the statistical function is a measure of randomness of characters in a subset of text against an expected distribution of said characters.

In a second aspect, the present application describes a computing device. The computing device may include a processor; a memory; and a statistical data fingerprinting and data similarity tracing application stored in the memory and containing processor-executable instructions that, when executed by the processor, are to cause the processor to: apply a statistical function to a subset of text in a first document thereby generating a first fingerprint, apply the statistical function to a subset of text in the second document thereby generating a second fingerprint, compare the first fingerprint to the second fingerprint, and determine that the subset of text in the first document matches the subset of text in the second document based on the first fingerprint threshold matching the second fingerprint, wherein the statistical function is a measure of randomness of characters in a subset of text against an expected distribution of said characters.

In a third aspect, the present application describes a computer-readable storage medium storing processor-executable instructions that, when executed by a processor, cause the processor to perform any of the methods described herein. The computer-readable storage medium may be non-transitory. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

As noted above, there is a need for statistical fingerprinting of document text to enable tracing of text similarity in a more fine-grained manner such that portions of text within documents can be fingerprinted and accurately matched with data from other documents. Moreover, it would be advantageous to provide a mechanism for determining the statistical deviation of one set of data to another so that, using fuzzy matching, one can then determine to what degree an arbitrary set of text is similar to a known fingerprinted set of text.

Accordingly, in accordance with one aspect of the present application, a statistical data fingerprinting and data similarity tracing application is described. The statistical data fingerprinting and data similarity tracing application may be a software-implemented application that determines whether a subset of text in a first document matches a subset of text in a second document. It does so, in one example implementation, by determining that a first fingerprint of the subset of text in the first document threshold matches a second fingerprint of the subset of text in the second document. The first fingerprint and the second fingerprint may be generated by applying a statistical function to the subsets of text in the first and second documents, respectively. The statistical function may be a measure of randomness of a count of each character in a subset of text against an expected distribution of said characters. In one example, the measure of randomness may be a Euclidian distance of the count of each character in the subset of text from a Cartesian origin. In another example, the measure of randomness may be a rectilinear distance of the count of each character in the subset of text from a Cartesian origin.

Figure 1:
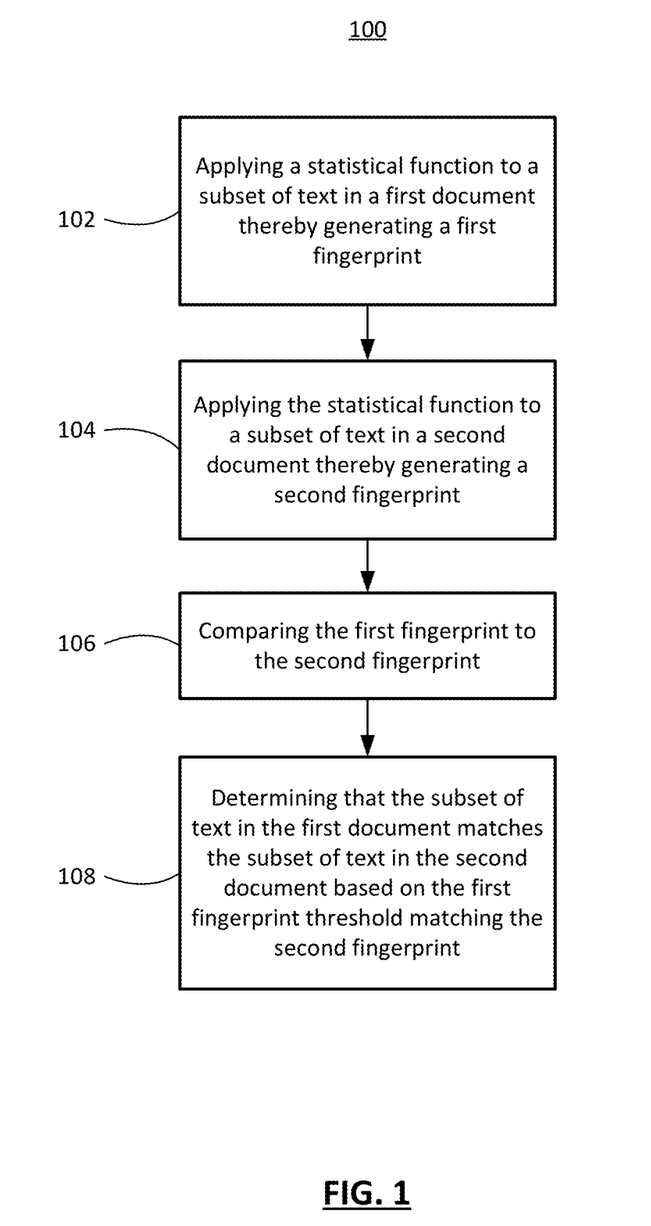
FIG. 1 shows, in flowchart form, an example computer-implemented method of statistical data fingerprinting and tracing data similarity of documents.
Figure 6:
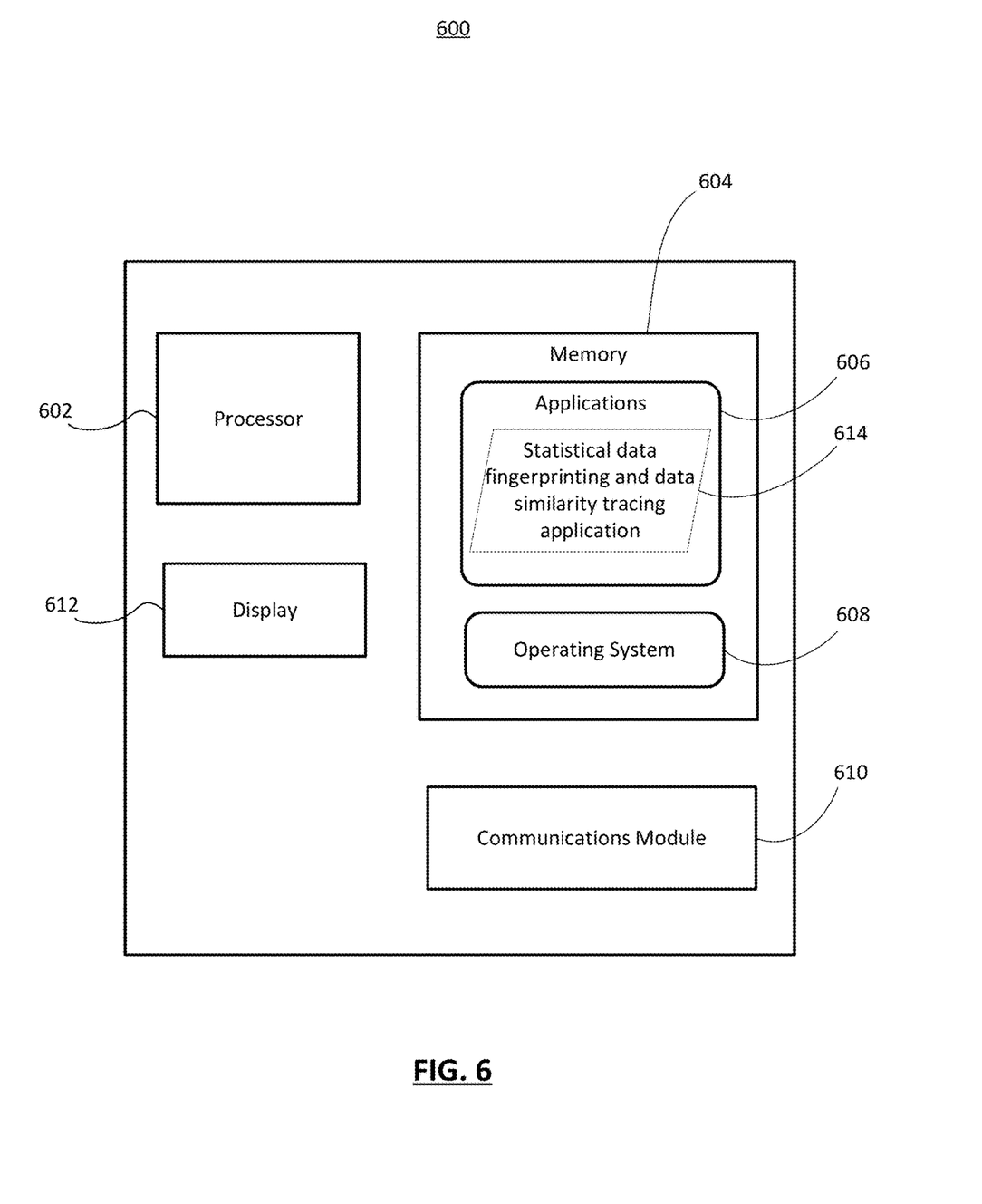
FIG. 6 depicts, in block diagram form, an example computing device configured for statistical data fingerprinting and data similarity tracing of documents.

Reference is first made to FIG. 1, which shows a computer-implemented method 100 of statistical data fingerprinting and tracing data similarity of documents in accordance with an example of the present application. The method 100 may be implemented by one or more computing devices having suitable computer-executable instructions that are to cause the computing device(s) to carry out the described operations. The instructions may be implemented by way of a software module or application executing on one or more computing device(s). Portions of the method 100 may be carried out by a computing device as depicted in FIG. 6.

At operation 102, the method 100 includes applying a statistical function to a subset of text in a first document thereby generating a first fingerprint (typically a decimal number). Selection of a subset of text may be random. It has been found that the longer the selected subset of text is the more reliable the comparison of subsets or documents tends to be. In some cases, a 512-byte subset is preferred, and in some cases a 256-byte subset is preferred. It may be that the smaller the set of characters in a document, the smaller the selected subset of text can be for optimal performance. In one example, the length of the selected subset is approximately the size of the set of text to be compared/found. In another example, the ideal length of a subset of text is about 2× the symbol-domain size. Thus, for pure, normalized English text having approximately 36 unique symbols the subset window may be about 70-80. For raw binary, the subset length may be 256 (presuming 8-bit bytes) and may, in some cases, be longer (e.g. 512 bytes). The statistical function is a measure of randomness of a count of each character in the subset against an expected distribution of said characters. Put another way, the tally of each character as a distance in a dimension is compared to an expected tally of each character. The expected tally or distribution of characters may be chosen as any suitable distribution. For example, a distribution weighted more heavily toward vowels may be the expected distribution. In another example, a distribution weighted relatively more for particular letters/characters may be chosen as appropriate for a given language or class of documents. In yet another example, a flat distribution, in which all characters are weighted equally, may be the expected distribution of characters. It is to be noted that any suitable statistical test may be used as the statistical function as long as the test/function is able to measure statistical-randomness and handle different lengths of data. Some example functions may include: Euclidian distance, rectilinear distance, Shannon entropy, etc.

In one example embodiment, the statistical function measure of randomness is a Euclidian distance of the count of each character in the subset of text from a Cartesian origin. The Euclidian distance (also known as Pythagorean distance) is the length of a line segment between any two points with Cartesian coordinates, given by:

$$d(p,q)=|p-q|$$

where $p$ is the first point, $q$ is the second point.

Since the Euclidian distance of the count of each character is taken relative to the Cartesian origin (0) in this example embodiment, the Euclidian distance of the count of each character (x) may simply be given as:

$$d(x)=x$$

In a further embodiment, the statistical function measure of randomness is a distance of the count of each character in the subset of text from a Cartesian origin in two-dimensional space or higher. Thus, for the example of Euclidian distance, the distance is given by:

$$d(p,q)=\sqrt{\Sigma_{i=1}^{n}(p_i-q_i)^2}$$

where p is the first point, q is the second point, and n is the real vector space dimension.

Since the Euclidian distance of each character is taken relative to the Cartesian origin (i.e. q=(0, 0, . . . )) in this example embodiment, the Euclidian distance of each character (x) may simply be given as the root of the squares of the count of each character summed over the number of dimensions greater than 1:

$$d(x, 0) = \sqrt{\sum_{i=1}^{n} (x_i)^2}$$

In another example embodiment, the statistical function measure of randomness is a rectilinear distance of the count of each character in the subset of text from a Cartesian origin. The rectilinear distance, also known as taxicab metric or Manhattan length or Li distance, is the shortest distance between any two points with Cartesian coordinates following only axis-aligned directions, given by:

$$d(p,q)=\Sigma_{i=1}^{n}|p_i-q_i|$$

where p is the first vector, q is the second vector, and n is the real vector space dimension.

It will be appreciated that while the above examples are given for distance measurements relative to, or starting from, a Cartesian origin, any arbitrary point can act as the starting position. The equations for calculating Euclidian distance or rectilinear distance are then adjusted accordingly.

In one example embodiment, the statistical function measure of randomness is a measure of Shannon entropy of the count of each character in the subset of text. In this example, it may be that the Shannon entropy of a given 512-byte subset of text is derived.

In one example embodiment, the method 100 further includes normalizing the subset of text in the first document, the normalizing the subset of text in the first document occurring prior to the applying the statistical function to the subset of text in the first document. It will be appreciated that normalizing is dependent upon the context of action, and that there are cases where no normalization should be performed (such as comparing through n-byte XOR).

It may be that the normalizing the subset of text in the first document includes one or more of deleting all whitespace, deleting all formatting, transposing all characters into lowercase, converting to a specific encoding (e.g. UTF-8) and/or and condensing homoglyphs into a single character (e.g. each of characters "e", "é", "è", "ê", "ë" becomes "e"). Other forms of normalizing are contemplated.

Figure 4:
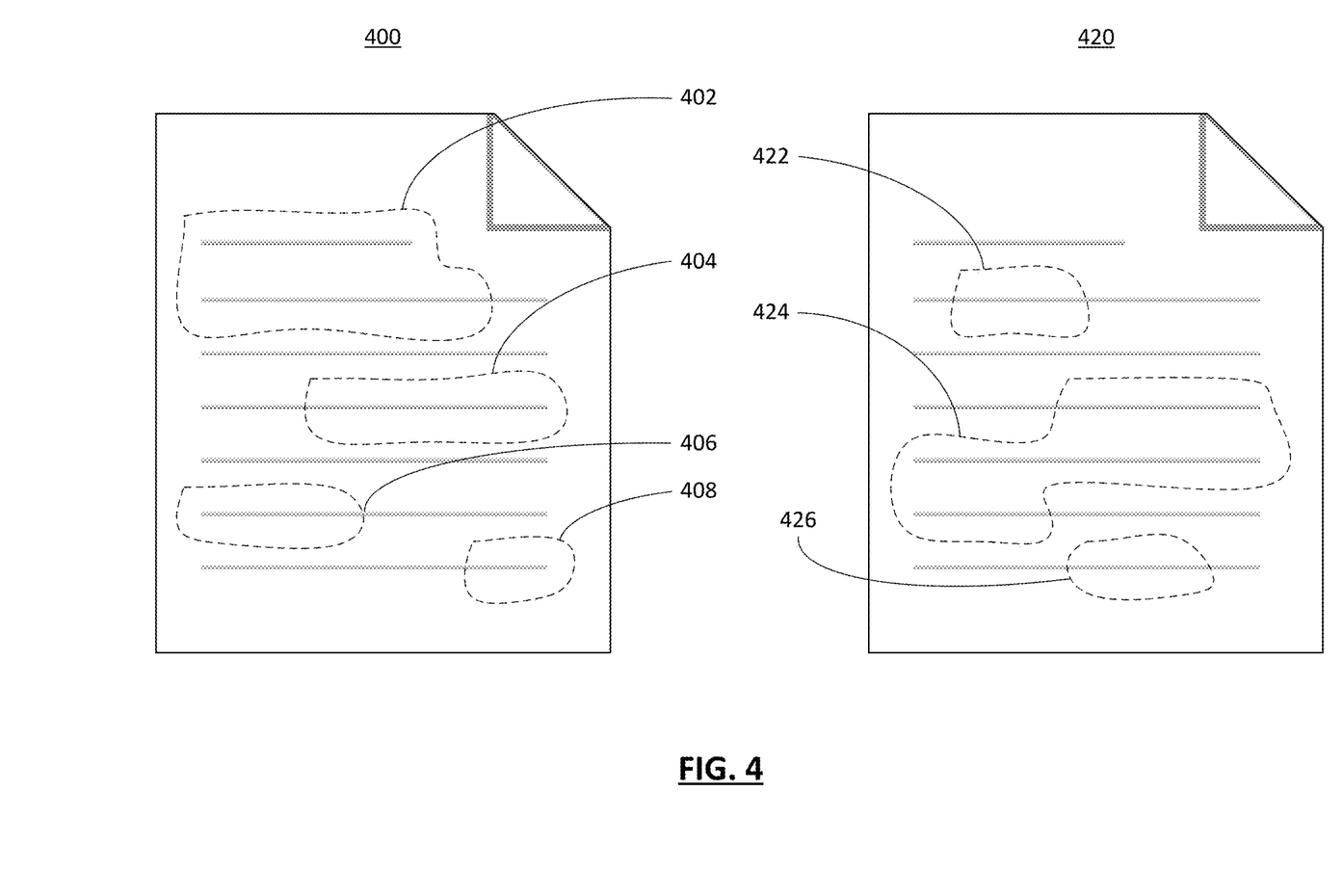
FIG. 4 illustrates, in schematic form, a first document and a second document with multiple subsets of text.

In another example embodiment, the subset of text in the first document includes two or more subsets of text in the first document (as further discussed in relation to FIG. 4).

Figure 5:
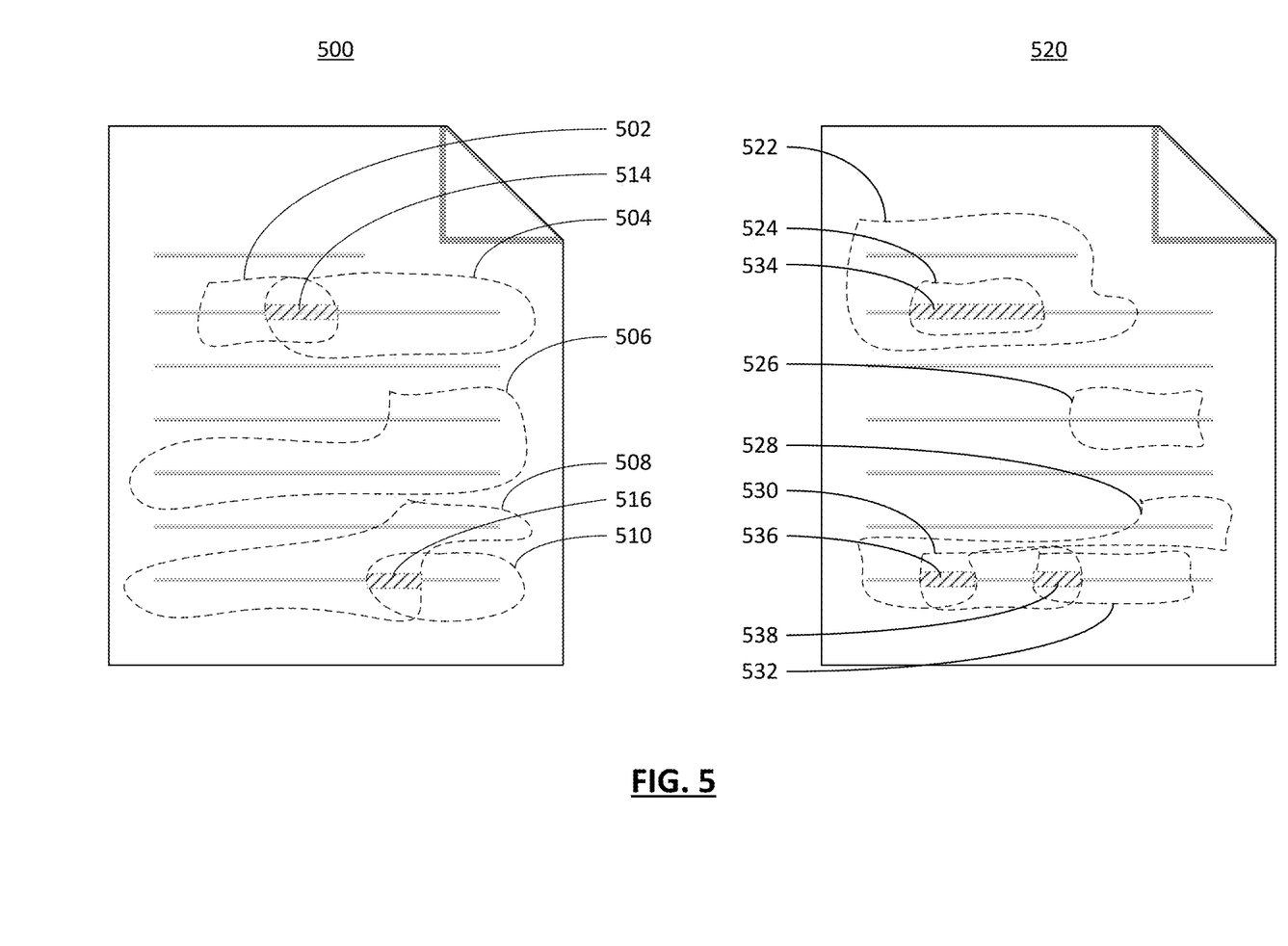
FIG. 5 illustrates, in schematic form, a first document and a second document having overlapping subsets of text.

In yet another example embodiment, at least one of the two or more subsets of text in the first document overlaps another of the two or more subsets of text in the first document (as further discussed in relation to FIG. 5).

At operation 104, the method 100 includes applying the statistical function to a subset of text in a second document thereby generating a second fingerprint. As previously described, the statistical function is a measure of randomness of a count of each character in the subset against an expected distribution of said characters. The measure of randomness may be a Euclidian or rectilinear distance of the count of each character in the subset of text from a Cartesian origin, or it may be a measure of Shannon entropy of the count of each character in the subset of text (e.g. 512-byte subset).

In one example embodiment, the method 100 further includes normalizing the subset of text in the second document, the normalizing the subset of text in the second document occurring prior to the applying the statistical function to the subset of text in the second document. It will be appreciated that normalizing is dependent upon the context of action, and that there are cases where no normalization should be performed (such as comparing through n-byte XOR).

It may be that the normalizing the subset of text in the second document includes one or more of deleting all whitespace, deleting all formatting, transposing all characters into lower-case, converting to a specific encoding (e.g. UTF-8), and condensing homoglyphs into a single character (e.g. each of characters "e", "é", "è", "ê", "ë" becomes "e"). Other forms of normalizing are contemplated.

In another example embodiment, the subset of text in the second document includes two or more subsets of text in the second document (as further discussed in relation to FIG. 4).

In yet another example embodiment, at least one of the two or more subsets of text in the second document overlaps another of the two or more subsets of text in the second document (as further discussed in relation to FIG. 5).

At operation 106, the method 100 includes comparing the first fingerprint to the second fingerprint.

At operation 108, the method 100 includes determining that the subset of text in the first document matches the subset of text in the second document based on the first fingerprint threshold matching the second fingerprint. The statistical function may be a measure of randomness of a count of each character in the two subsets of text against an expected distribution of said characters.

In one example embodiment, a threshold for the threshold matching is adjustable according to a desired sensitivity level. It is found, experimentally, that a 99.98% match threshold for the Euclidian distance example case (512 byte sequences) provides very good results in accurately matching subsets of text.

In a further example embodiment, the method may determine that the first document matches the second document based on determining that a threshold number of the two or more subsets of text in the first document match the two or more subsets of text in the second document. It may be that an end to end comparison of fingerprints between the documents is made, and based on such comparison resulting in matching subsets of text exceeding a defined threshold, making a determination that the first document matches the second document.

Figure 2A:
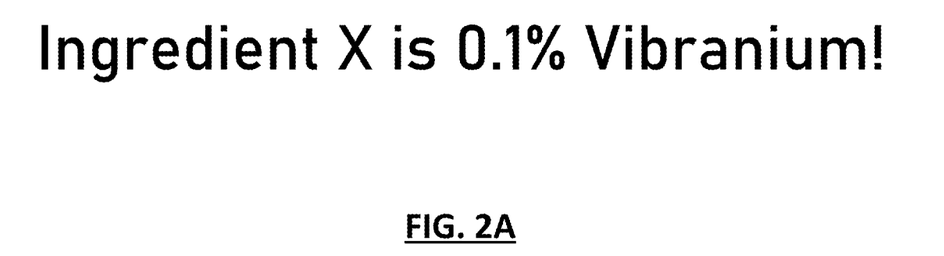
FIG. 2A depicts an example string of text.
Figure 2B:
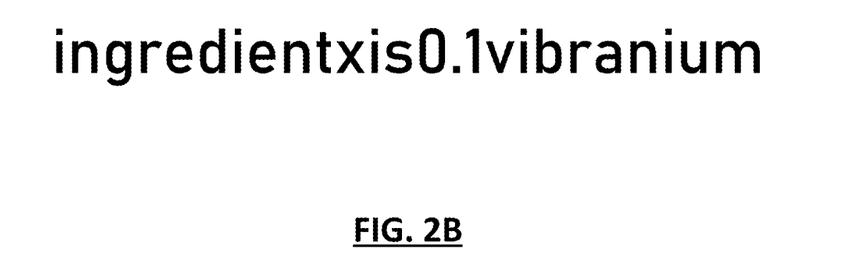
FIG. 2B depicts the example string of FIG. 2A after normalization.

Reference is now made to FIGS. 2A and 2B, which depict an example string of text and the string of text after normalization.

In FIG. 2A, a to-be-protected text string reads: "Ingredient X is 0.1% Vibranium!". It is to be noted that, in application, subsets of text would be significantly larger sets of text.

In FIG. 2B, the example text string is normalized and now reads: "ingredientxis01vibranium". The normalization has converted all letters to lowercase, removed spaces, and erased all non-letter/non-numeric characters. Other normalization techniques are contemplated, such as, for example, converting to a specific encoding (e.g. UTF-8). As an example, a statistical randomness measurement function applied to the normalized text string against a flat distribution may give the fingerprint result F=0.748351046175834.

Figure 3A:
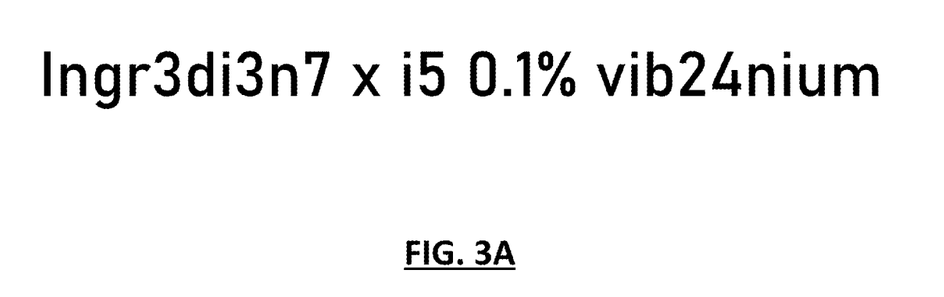
FIG. 3A depicts the example string of FIG. 2A altered by character transposition.
Figure 3B:
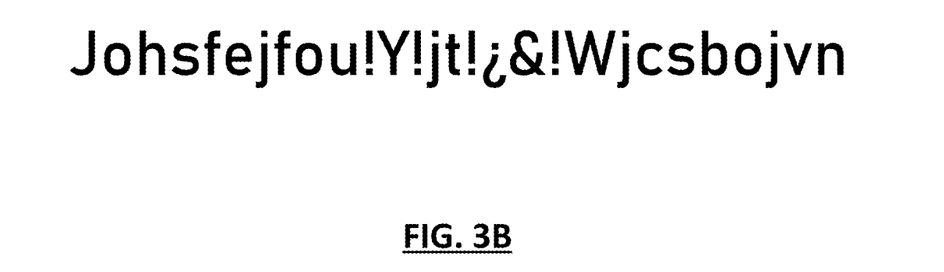
FIG. 3B depicts the example string of FIG. 2A altered by single character XOR operation.
Figure 3C:
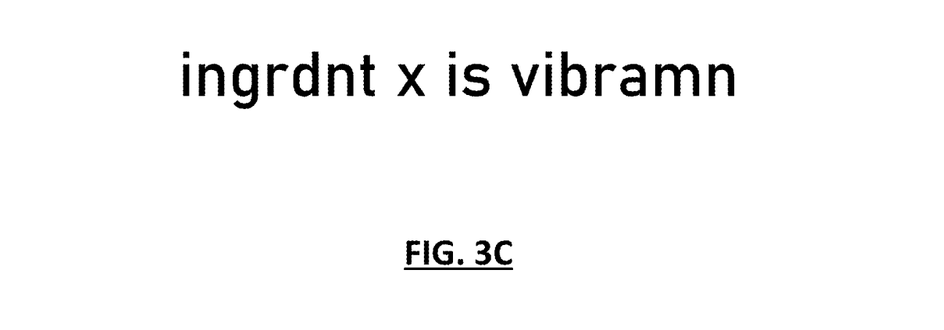
FIG. 3C depicts a text altered version of the example string of FIG. 2A.

Reference is now made to FIGS. 3A, 3B and 3C, which depict the example string of FIG. 2A in various states of alteration.

In FIG. 3A, the example string of FIG. 2A is altered by character transposition. In this example, certain letters have been transformed to certain numbers. For example, the letter "e" now reads "3", and "s" now reads "5". As an example, the same statistical randomness measurement function may be applied to this altered text string against a flat distribution, which may result in fingerprint F=0.748351046175834. Notably, despite the translation of some of the characters into replacement characters, the statistical distribution of the characters against the flat distribution is unchanged. As a result, the fingerprints match exactly, and the second example string of FIG. 3A is considered a match to the first example string of FIG. 2A.

In FIG. 3B, the example string of FIG. 2A is altered by single character XOR operation (or ROTx (1): rotation about the x-axis in 2-dimensions or greater), and now reads "Johsfejfou!Y!jt!¿&!Wjcsbojvn". That is, each character (even spaces) has been adjusted up one character in the given character set. As an example, if the same statistical randomness measurement function, assuming a flat expected distribution, is applied to this altered text string it will result in fingerprint F=0.748351046175834. Accordingly, this XOR'd example may also result in detection of an exact match.

In FIG. 3C, the example string of FIG. 2A is text altered. In this particular example, letters are converted to lowercase, some vowels are deleted, and some consonants are swapped. The string now reads "ingrdnt x is vibramn". As an example, if the same statistical randomness measurement function is applied to this altered text string, using a flat expected distribution, it may result in fingerprint F=0.748351048675309 and may, depending on the chosen sensitivity, be detected as a match.

Reference is now made to FIG. 4, which illustrates a first document 400 and a second document 420 with multiple subsets of text.

As described above, the subset of text in the first document 400 may include two or more subsets of text 402, 404, 406, 408 in the first document 400, and the subset of text in the second document 420 may include two or more subsets of text 422, 424, 426 in the second document 420. In some implementations, each subset of text is of the same length. However, in some implementations, as shown in FIG. 4, the subsets of text may be of different lengths. As illustrated, the two or more subsets of text 402, 404, 406, 408, 422, 424, 426 may be of varying lengths.

Reference is now made to FIG. 5, which illustrates a first document 500 and a second document 520 having overlapping subsets of text.

As described above, at least one of the two or more subsets of text in the first document 500 may overlap another of the two or more subsets of text in the first document 500. For example, subset 502 and subset 504 overlap to produce overlapping portion 514. Subset 508 (which spans two lines) overlaps subset 510 to produce overlapping portion 516. Further, at least one of the two or more subsets of text in the second document 520 may overlap another of the two or more subsets of text in the second document 520. For example, subset 522 and subset 534 overlap to produce overlapping portion 524. In this example, subset 534 is entirely contained within subset 522. As illustrated, subset 526 is standalone and does not overlap. Subset 528 (which spans two lines) overlaps both subset 530 and subset 532 to produce overlapping portion 536 and overlapping portion 538, respectively. The foregoing examples are merely intended to give examples of overlapping subsets. Other forms and configurations of subsets of text are contemplated.

Reference is now made to FIG. 6, which depicts an example computing device 600 implementing a statistical data fingerprinting and data similarity tracing application 614. The computing device 600 includes a processor 602, which may include one or more processing units and a memory 604. The memory 604 stores an operating system 608 and applications 606. The operating system 608 and applications 606 contain processor-executable instructions that, when executed by the processor 602, configure the processor 602 to carry out the operations described. The applications 606 may include statistical data fingerprinting and data similarity tracing application 614. The memory 604 may further store the documents being compared and one or more statistical functions. After application of a particular statistical function to subsets of text for each document, the fingerprints generated by statistical data fingerprinting and data similarity tracing application 614 may also be stored in the memory 604. Upon comparing generated fingerprints for both documents, and determining matches between respective subsets of text, the statistical data fingerprinting and data similarity tracing application 614 may store the results of the comparison and matching in the memory 604.

The computing device 600 may further include a display 612 and a communications module 610. In some implementations, the statistical data fingerprinting and data similarity tracing application 614 generates a user interface that is output on the display 612. The user interface displayed may include display of the documents and/or subsets of text being compared, the set of generated fingerprints, and the results of the comparison between fingerprints. The statistical data fingerprinting and data similarity tracing application 614 may, additionally or alternatively, transmit such results to a remote device or administrator via the communications module 610, for example.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer-implemented method of statistical data fingerprinting and tracing data similarity of documents comprising:
applying a statistical function to a subset of text in a first document thereby generating a first fingerprint;
applying the statistical function to a subset of text in a second document thereby generating a second fingerprint;
comparing the first fingerprint to the second fingerprint; and
determining that the subset of text in the first document matches the subset of text in the second document based on the first fingerprint threshold matching the second fingerprint,
wherein the statistical function is a measure of randomness of a count of each character in a subset of text against an expected distribution of said characters.

2. The method of claim 1, wherein the measure of randomness is a Euclidian distance of the count of each character in the subset of text from a Cartesian origin.

3. The method of claim 2, wherein the Euclidian distance is a distance in two-dimensional space or higher.

4. The method of claim 1, wherein the measure of randomness is a rectilinear distance of the count of each character in the subset of text from a Cartesian origin.

5. The method of claim 1, wherein the measure of randomness is a measure of Shannon entropy of the count of each character in the subset of text.

6. The method of claim 1, wherein a threshold for the threshold matching is adjustable according to a desired sensitivity level.

7. The method of claim 1, wherein the subset of text in the first document includes two or more subsets of text in the first document, and the subset of text in the second document includes two or more subsets of text in the second document.

8. The method of claim 7, wherein at least one of the two or more subsets of text in the first document overlaps another of the two or more subsets of text in the first document, and at least one of the two or more subsets of text in the second document overlaps another of the two or more subsets of text in the second document.

9. The method of claim 7, further comprising:
determining that the first document matches the second document based on determining that a threshold number of the two or more subsets of text in the first document match the two or more subsets of text in the second document.

10. The method of claim 1, further comprising:
normalizing the subset of text in the first document, the normalizing the subset of text in the first document occurring prior to the applying the statistical function to the subset of text in the first document; and
normalizing the subset of text in the second document, the normalizing the subset of text in the second document occurring prior to the applying the statistical function to the subset of text in the second document,
wherein the normalizing the subset of text in the first document and the normalizing the subset of text in the second document, respectively, include one or more of deleting all whitespace, deleting all formatting, transposing all characters into lower-case, converting to a specific character set, and condensing homoglyphs into a single character.

11. A computing device comprising:
a processor;
a memory; and
a statistical data fingerprinting and data similarity tracing application stored in the memory and containing processor-executable instructions that, when executed by the processor, are to cause the processor to:
apply a statistical function to a subset of text in a first document thereby generating a first fingerprint,
apply the statistical function to a subset of text in a second document thereby generating a second fingerprint,
compare the first fingerprint to the second fingerprint, and
determine that the subset of text in the first document matches the subset of text in the second document based on the first fingerprint threshold matching the second fingerprint,
wherein the statistical function is a measure of randomness of a count of each character in a subset of text against an expected distribution of said characters.

12. The computing device of claim 11, wherein the measure of randomness is a Euclidian distance of the count of each character in the subset of text from a Cartesian origin.

13. The computing device of claim 12, wherein the Euclidian distance is a distance in two-dimensional space or higher.

14. The computing device of claim 11, wherein the measure of randomness is a rectilinear distance of the count of each character in the subset of text from a Cartesian origin.

15. The computing device of claim 11, wherein the measure of randomness is a measure of Shannon entropy of the count of each character in the subset of text.

16. The computing device of claim 11, wherein a threshold for the threshold matching is adjustable according to a desired sensitivity level.

17. The computing device of claim 11, wherein the subset of text in the first document includes two or more subsets of text in the first document, and the subset of text in the second document includes two or more subsets of text in the second document.

18. The computing device of claim 16, wherein at least one of the two or more subsets of text in the first document overlaps another of the two or more subsets of text in the first document, and at least one of the two or more subsets of text in the second document overlaps another of the two or more subsets of text in the second document.

19. The computing device of claim 16, wherein the instructions, when executed, are to further cause the processor to:
determine that the first document matches the second document based on determining that a threshold number of the two or more subsets of text in the first document match the two or more subsets of text in the second document.

20. A computer-readable storage medium storing processor-executable instructions for statistical data fingerprinting and tracing data similarity of documents, wherein the processor-executable instructions, when executed by a processor, are to cause the processor to:
apply a statistical function to a subset of text in a first document thereby generating a first fingerprint;
apply the statistical function to a subset of text in a second document thereby generating a second fingerprint;
compare the first fingerprint to the second fingerprint; and
determine that the subset of text in the first document matches the subset of text in the second document based on the first fingerprint threshold matching the second fingerprint,
wherein the statistical function is a measure of randomness of a count of each character in a subset of text against an expected distribution of said characters.

* * * * *